United States Patent Office 3,086,057
Patented Apr. 16, 1963

---

3,086,057
NITRO-STILBENE-HYDROXYALKYL SULFONES AND PROCESS OF PREPARING SAME
Asim Kumar Sarkar, Leeds, England, assignor to Hickson & Welch Limited, Castleford, England, a British company
No Drawing. Filed May 3, 1961, Ser. No. 107,305
Claims priority, application Great Britain May 4, 1960
12 Claims. (Cl. 260—607)

This invention is concerned with new chemical compounds of use inter alia as intermediates in the production of stilbyl group-containing optical whitening agents.

Certain stilbyl group-containing optical whitening agents, for example stilbyl triazoles, are conveniently prepared by a process which comprises the steps of condensing an aromatic mono- or di-aldehyde with a derivative of a 4-nitro-toluene-2-sulphonic acid, reducing the nitro group of the resulting compound to an amino group, diazotizing the resultant amino compound and coupling the diazotized compound with an amino group-containing cyclic compound in a position ortho to said amino group, oxidation of the resultant amino group yielding a triazole compound.

As described in British patent specification No. 668,199 attempts to condense aromatic aldehydes with nitrotoluene sulphonic acids or certain derivatives thereof give rise to difficulties, and the production of suitable stilbene derivatives for use in the synthesis of optical whitening agents is achieved according to that specification by condensation of an appropriate aromatic aldehyde with a nitrotoluene sulphonic acid aryl ester.

In efforts to produce optical whitening agents having balanced solubility or dispersibility it was attempted to make compounds of the stilbyl triazole type containing in place of the sulphonic acid group or groups (attached to the stilbene nucleus) one or more sulphone group which latter have a hydrophilic group. For this purpose the condensation of aromatic aldehydes with various nitrotoluene sulphones containing hydrophilic groups in the sulphone residue was investigated but it was found in many cases that this reaction is unsatisfactory. For example the reaction of a carboxyalkyl sulphone derivative of nitrotoluene with aromatic aldehydes proceeds with difficulty. It was found however that the condensation of aromatic aldehydes with hydroxyalkyl or hydroxy polyoxyalkylene sulphone derivatives of nitrotoluene proceeds in general economically and enables the corresponding stilbyl sulphone derivatives to be readily obtained. By this means therefore it is possible to produce readily new and useful intermediates for the synthesis of stilbyl optical whitening agents containing a sulphone group or groups having a hydrophilic group therein. Such optical whitening agents have been found to have useful properties and are the subject of copending U.S. application No. 107,304, filed May 3, 1961.

According to the invention therefore there is provided a process for the production of stilbyl sulphones useful inter alia as intermediates in the production of optical whitening agents and dyestuffs which comprises condensing an aromatic aldehyde with a nitrotoluene substituted by a group $-SO_2(RO)_nR''$ in which R is an alkylene or a hydroxyalkylene group, R'' is a hydrogen atom or an alkyl group and $n$ is an integer; the alkylene group in said group $-SO_2(RO)_nR''$ preferably containing at least two carbon atoms.

Suitable nitrotoluene sulphones for use as starting materials for the process of the invention have the general formula:

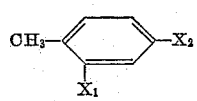
(I)

in which one of the groups $X_1$ or $X_2$ represents a nitro group, the other group $X_1$ or $X_2$ representing the group $-SO_2[RO]_nH$ as defined above.

Preferred compounds of general Formula I are those in which R represents an alkylene group containing 2 or 3 carbon atoms and $n$ is an integer from 1–10, advantageously those in which the group $X_2$ is the nitro group.

Particularly preferred compounds of general Formula I are those of the formula

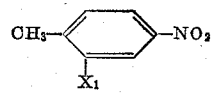

where $X_1$ is $-SO_2(CH_2CH_2O)_n-H$ $-SO_2CH_2CHCH_2OH_3$
$\quad\quad\quad | $
$\quad\quad\quad OH$ $-SO_2CH_2CHCH_3$
$\quad\quad\quad | $
$\quad\quad\quad OH$ $-SO_2[CH_2CH(CH_3)O]_nH$
$\quad\quad\quad\quad\quad | $
$\quad\quad\quad\quad\quad OH$ $-SO_2CH_2CH-CH_2OH$
$\quad\quad\quad\quad | $
$\quad\quad\quad\quad OH$ $-SO_2CH_2-CH-CH_2-OCH_2CH_2-OCH_3$
$\quad\quad\quad\quad\quad | $
$\quad\quad\quad\quad\quad OH$ or $-SO_2CH_2-CH-CH_2(OCH_2CH_2)_n.O.R_2$
$\quad\quad\quad\quad\quad | $
$\quad\quad\quad\quad\quad OH$ $R_2$ being an alkyl group containing 1 to 4 carbon atoms.

The invention further provides new stilbyl derivatives useful as intermediates for the preparation of optical whitening agents and dyestuffs and having the general formula:

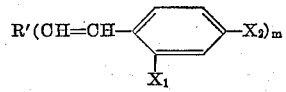
(II)

in which R' represents an aromatic residue and $X_1$ and $X_2$ have the meanings stated above, and $m$ is either 1 or 2.

These componds, which are new compounds, can themselves be converted to compounds useful as optical whitening agents (see U.S. application No. 107,304) by a process for example including reduction of the nitro group $X_1$ or $X_2$, diazotization of the resulting amino compound, coupling of said diazotized product with an amino-substituted heterocyclic or aromatic compound capable of coupling therewith in a position ortho to said amino group, the resultant o-amino azo dye then being oxidised to give a triazole useful as an optical whitening agent.

The nitrotoluene sulphones used in the process according to the invention can be prepared in any convenient manner. The compounds of Formula I are particularly readily prepared by reaction of the parent sulphinic acid or a salt thereof, in particular an alkali-metal salt, with one or more molecules of an appropriate alkylene oxide in which the alkylene group contains at least two carbon atoms; examples of particularly suitable oxides include those oxides the alkylene groups of which contain 2–6 carbon atoms, in particular ethylene and propylene oxide. The compounds of general Formula I may also be prepared by the reaction of the parent sulphinic acid or a salt thereof, in particular alkali-metal salt, with an alkylene halohydrin, the alkylene group of which contains at least two carbon atoms. Preferred halohydrins are those the alkylene groups of which contain 2–6 carbon atoms, in particular ethylene chlorohydrin and propylene chlorohydrin.

The reaction of the alkylene oxide or of the halohydrin with the parent sulphinic acid (that is with 4-nitrotoluene-2-sulphinic acid or 2-nitrotoluene-4-sulphinic acid) or a salt thereof may be carried out under various conditions. Thus in the case of ethylene oxide one may effect the reaction at slightly elevated temperature, the pH being controlled during the reaction at about 7–8, either by addition of acid or by buffering the reaction mixture. Similar conditions may, in general, be used for the reaction of the other alkylene oxides and halohydrins.

The condensation of the nitrotoluene sulphone with the aromatic aldehyde is preferably effected in the presence of a basic catalyst. Suitable catalysts include in particular secondary amines such as piperidine, morpholine and dibutylamine, of which piperidine is generally to be preferred. The reaction is convieniently effected at an elevated temperature for example oil bath temperature and may if desired by carried out in a high boiling inert organic solvent.

As examples of aromatic aldehydes which may be used in accordance with the invention may be mentioned aromatic monoaldehydes in which the aldehyde group is a ring substituent such as benzaldehyde, and nuclear-substituted derivatives of such aldehydes, not containing substituents reactive with aldehyde groups, as well as naphthaldehydes and dialdehydes such as terephthalaldehyde and isophthalaldehyde which may also be substituted in the nucleus by substituents which are not reactive to aldehyde groups.

In order that the invention may be more fully understood, the following examples are given, by way of illustration only. In these examples parts are by weight.

EXAMPLE 1

16.5 parts of 4-nitro-toluene-2-(hydroxyethyl)-sulphone, 2 parts of piperidine and 10 parts of benzaldehyde are heated to 140° C. (oil bath temperature), for 6 hours. At the end of 6 hours the reaction mixture is slurried in glacial acetic acid and filtered. A yellow solid (18 g.) M.P. 139–40° of 4-nitro-stilbene-2-($\beta$-hydroxyethyl) sulphone is obtained. The solid can be recrystallised from acetic acid.

The starting sulphone used in this example may be prepared by either of the following methods.

Method 1

60 gms. sodium-4-nitro-toluene-2-sulphinate (80%) are refluxed with 200 gms. of ethylene chlorohydrin for 5 hours. Excess ethylene chlorohydrin is then distilled off and crystallisation of the crude solid so obtained from chloroform gives 10.5 gms. of pure 4-nitro-toluene-2($\beta$-hydroxyethyl)-sulphone. M.P. 138–140° C.

Method 2

23.5 gms. of 4-nitro-toluene-2-sulphinic acid are suspended in 200 ccs. of water. The suspension is neutralised with a solution of sodium hydroxide. The solution at this stage should be alkaline to Brilliant Yellow. 8.4 gms. of boric acid are added to the solution. 12.5 gms. of ethylene oxide are now added below 10° C. to the solution, and the temperature of the solution raised to 60° C. under stirring. At the end of 1 hour a further 12.5 gms. of ethylene oxide are added and again the temperature is raised to 60° C. This procedure is repeated till a total of 70 gms. of ethylene oxide has been added. 4-nitro-toluene-2($\beta$-hydroxyethyl)-sulphone crystallised out at the end of the reaction. The suspension is filtered to give 24 gms. of the compound. M.P. 137–139° C.

EXAMPLE 2

43 gms. of 4-nitro-toluene-2-sulphinic acid are suspended in 400 ccs. of water. The suspension is neutralised with sodium hydroxide solution as in Method 2. 16.8 gms. of boric acid are next added. 35 gms. of propylene oxide are then added to the suspension and the mixture stirred at 60° C. for 6 hours. The reaction mixture is cooled and filtered to give 29 gms. of 4-nitro-toluene-2-(2'-hydroxy-n-propyl-sulphone. M.P. 99–101° C.

51.4 parts of 4-nitro-toluene-2-(2'-hydroxy-n-propyl)-sulphone, 25 parts of benzaldehyde and 7 parts of piperidine are heated together at 130–140° C. for 6 hours. The reaction mixture is then cooled and 200 parts of ethanol are added to the mixture. The mixture is washed and filtered and washed with alcohol. The solid so obtained is 4-nitro-stilbene-2-(2'-hydroxy-n-propyl)-sulphone, and which has an M.P. of 197° C.

EXAMPLE 3

27.5 parts of 4-nitro-toluene-2-($\beta$,$\gamma$-dihydroxy-propyl)-sulphone, 12.5 parts benzaldehyde and 3.5 parts of piperidine are heated together at 130–140° C. for 6 hours. 175 parts of ethanol are added to the cooled reaction mixture and the mixture boiled on a water bath until the product is granular. The mixture is filtered cold and the solid washed with a little alcohol. The 4-nitro-stilbene-2-($\beta$,$\gamma$-dihydroxypropyl)-sulphone thus obtained has a melting point of 185–188° C. The 4-nitro-toluene-2-($\beta$,$\gamma$-dihydroxypropyl)-sulphone used as starting material can be prepared in the following manner.

Para-nitrotoluene sulphonic acid (sodium salt) (44.6 gms.) and glycidol (14.6 gms.) are heated to 60° C. with good agitation for 6 hours. At the end of the reaction the mixture is cooled, filtered and the 4-nitro-toluene-2-($\beta$,$\gamma$-dihydroxypropyl)-sulphone (20.5 gms.) is obtained, M.P. 94–96° C. On recrystallization from water a product of M.P. 96–98° C. is obtained.

EXAMPLE 4

4-AMINO-STILBENE-2-($\beta$-HYDROXY-4',7'-DIOXA OCTYL)-SULPHONE 33.3 parts of 4-nitro-toluene-2-(2-hydroxy-4',7'-dioxa octyl)-sulphone, 12.45 parts of benzaldehyde and 4 parts of piperidine are heated on an oil bath at 135° C. for 6 hours. The reaction mixture is slurried with methanol and filtered, and the product is well washed with methanol to yield 4-nitro-stilbene-2-($\beta$-hydroxy-4',7'-dioxa octyl)-sulphone having a melting point 142–146° C.

The nitro stilbene is dissolved in polyethylene glycol 300, reduced with iron and aqueous acetic acid and the resultant amino compound basified to Brilliant Yellow by the addition of sodium carbonate. Salt is added to the reaction mixture, and the solid material filtered off and extracted with acetone. The acetone is removed under reduced pressure, and the resulting liquid induced to crystallise. The 4-amino-stilbene-2-(2'-hydroxy-4',7'-dioxa octyl)-sulphone obtained melts at 95° C.

I claim:

1. A process for producing stilbyl sulphones comprising reacting at an elevated temperature and in the presence of a baisc catalyst a homocyclic aromatic aldehyde in which the ring structure contains no more than 10 carbon atoms with a substituted nitrotoluene selected from the group consisting of a compound of the formula

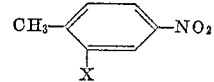

where X is selected from the group consisting of $$-SO_2(CH_2CH_2O)_n-H$$

wherein $n$ is an integer from 1–10,

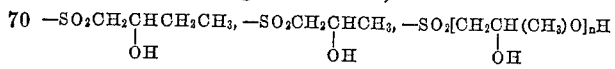

wherein $n$ is an integer from 1–10,

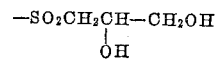

and

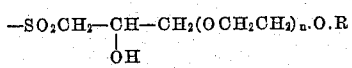

wherein $n$ is an integer from 1–10 and R is lower alkyl of from 1 to 4 carbon atoms and a compound of the formula

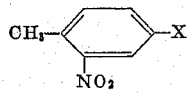

where X has the meaning given above.

2. A process as claimed in claim 1 wherein said catalyst is a secondary amine.

3. A compound selected from the group consisting of a compound of the formula

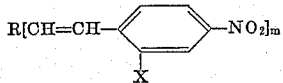

where R is a homocyclic aromatic radical in which the ring structure contains no more than 10 carbon atoms, $m$ is an integer no higher than 2 and X is selected from the group consisting of $-SO_2(CH_2CH_2O)_n-H$ wherein $n$ is an integer from 1–10,

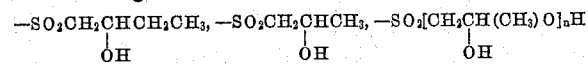

wherein $n$ is an integer from 1–10,

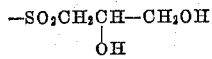

and

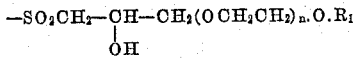

wherein $n$ is an integer from 1–10 and $R_1$ is lower alkyl of from 1 to 4 carbon atoms and a compound of the formula

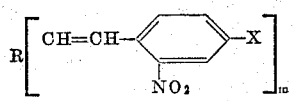

where X, R and $m$ have the meaning given above.

4. A compound as claimed in claim 3 wherein R is a phenyl group.

5. A process according to claim 1 in which the nitrotoluene sulphone is prepared by reaction of an alkali metal salt of the parent sulphinic acid with an alkylene oxide having at least two carbon atoms.

6. A process according to claim 5 in which the alkylene oxide has not more than three carbon atoms.

7. A process according to claim 1 in which the nitrotoluene sulphone is prepared by the reaction of an alkali metal salt of the parent sulphinic acid with an alkylene halohydrin having at least two carbon atoms.

8. A process according to claim 7 in which the alkylene halohydrin is an alkylene chlorohydrin having not more than three carbon atoms.

9. 4-nitro-stilbene-2-($\beta$-hydroxyethyl) sulphone.

10. 4-nitro-stilbene-2-($\beta,\gamma$-dihydroxypropyl) sulphone.

11. 4-nitro-stilbene - 2-(2'-hydroxy-n-propyl) sulphone.

12. 4-nitro-stilbene - 2-(2' - hydroxy-4',7'-dioxa-octyl) sulphone.

References Cited in the file of this patent

UNITED STATES PATENTS

| | | |
|---|---|---|
| 2,378,551 | Hentrich et al. | June 19, 1945 |
| 2,784,184 | Zweidler et al. | Mar. 5, 1957 |